United States Patent [19]

Betzig

[11] Patent Number: 5,254,854
[45] Date of Patent: Oct. 19, 1993

[54] SCANNING MICROSCOPE COMPRISING FORCE-SENSING MEANS AND POSITION-SENSITIVE PHOTODETECTOR

[75] Inventor: Robert E. Betzig, Chatham, N.J.

[73] Assignee: At&T Bell Laboratories, Murray Hill, N.J.

[21] Appl. No.: 787,298

[22] Filed: Nov. 4, 1991

[51] Int. Cl.$^5$ .......................... H01J 3/14; H01J 37/00
[52] U.S. Cl. ..................................... 250/234; 250/306
[58] Field of Search ............ 250/234, 235, 216, 227.2, 250/227.26, 306, 307; 359/368, 385; 385/12; 324/158 R, 244

[56] References Cited

U.S. PATENT DOCUMENTS

| | | | |
|---|---|---|---|
| Re. 33,387 | 10/1990 | Binnig | 250/306 |
| 4,747,034 | 5/1988 | Wickramasinghe | 250/216 |
| 4,851,671 | 7/1989 | Pohl | 250/306 |
| 4,889,988 | 12/1989 | Elings et al. | 250/306 |
| 4,894,537 | 1/1990 | Blackford et al. | 250/306 |
| 4,918,309 | 4/1990 | Beha et al. | 250/307 |
| 4,935,634 | 6/1990 | Hansma et al. | 250/560 |
| 4,992,659 | 2/1991 | Abraham | 250/306 |
| 5,003,815 | 4/1991 | Martin et al. | 73/105 |
| 5,103,174 | 4/1992 | Wandass et al. | 324/244 |

OTHER PUBLICATIONS

S-M '91 International Conference on Scanning Tunneling Microscopy Interlaken, Aug. 12-16, 1991, "A Stand-Alone Scanning Force and Friction Microscope," M. Hipp et al, p. 61.
S-M '91 International Conference on Scanning Tunneling Microscopy Interlaken, Aug. 12-16, 1991, "Micromachined Silicon Cantilevers and Tips for Scanning Probe Microscopy (SPM)," R. A. Buser et al, p. 62.

Primary Examiner—David C. Nelms
Assistant Examiner—John R. Lee
Attorney, Agent, or Firm—E. E. Pacher; M. I. Finston

[57] ABSTRACT

A scanning, imaging system is described. A probe having a fine tip is disposed adjacent the surface of a sample and scanned in a pattern lying in a plane substantially parallel to the surface. Means are provided for oscillating the probe tip, substantially within the scanning plane. Shear forces, acting upon the probe tip in a substantially lateral direction, cause changes in the oscillation of the probe tip. Such changes are detected by a position-sensitive photodetector.

15 Claims, 7 Drawing Sheets 200 nm

SCANNING MICROSCOPE COMPRISING FORCE-SENSING MEANS AND POSITION-SENSITIVE PHOTODETECTOR

FIELD OF THE INVENTION

The invention relates to the field of scanning microscopes, and more particularly to those microscopes that employ a fine probe which senses forces close to the surface of the object which is being scanned.

ART BACKGROUND

In recent years, scanning microscopes based on optical, electrical, or atomic force sensing have proven to be useful in a variety of disciplines. For example, the use of such microscopes is a useful adjunct to scanning electron microscopy (SEM) because contrast mechanisms alternative to those of SEM may be employed to explore the topography and composition of surfaces.

Atomic force microscopes have been described, in which a sharply pointed probe tip is brought near the surface of a sample, and forces acting normal to the surface affect the motion of the tip. For example, U.S. Pat. No. Re. 33,387, issued to G.K. Bining on Oct. 16, 1990, describes such an arrangement where the tip is mounted on a cantilever beam which is deflected as a result of the normal forces. A further example is U.S. Pat. No. 4,851,671, issued to D. W. Pohl on Jul. 25, 1989, which describe an alternative arrangement in which the tip is mounted on an oscillating crystal, and the frequency of oscillation is altered by the presence of normal forces.

When there is relative, lateral motion between the probe tip and the sample surface, forces are also present which act parallel, rather than normal, to the surface. (By "lateral" is meant that the relative displacement has a component which is, on the average, parallel to the sample surface in the vicinity of the probe). Such shear forces may arise, for example, from static or dynamic friction between the tip and the sample. Other shear forces arise as viscous forces in the air or other fluid medium between the tip and the sample.

A probe which senses shear forces can offer some advantages over conventional, normal-force-sensing probes. For example, shear forces generally act over greater distances, measured from the sample surface, than do normal forces. The farther from the surface a probe can act, the smaller is the likelihood of damaging the probe or the sample. Acting at a greater distance also makes it possible to scan more quickly, because collisions with high surface features are more easily avoided. Furthermore, a cantilever-mounted normal-force probe generally needs to be rather stiff along the lateral direction. By contrast, a shear-force probe can be more flexible along that direction, reducing the likelihood of damage by lateral collisions with the wall of surface features on the sample.

A probe which, in a limited context, senses forces which are directed parallel to a sample surface has been described in U.S. Pat. No. 4,992,659 issued to D. W. Abraham, et al., on Feb. 12, 1991. That patent describes a scanning, tunneling microscope which has a probe adapted to detect magnetic field in the sample being scanned. Magnetic fields in the sample act on the tunnel current in the probe to cause a Lorentz-force deflection of the probe parallel to the sample surface. Such a probe is limited in use to metallic samples having magnetic properties, and is subject to the same dangers of probe or sample damage as are conventional, normal-force-sensing probes.

Despite its advantages, practitioners in the field have hitherto failed to provide a general-purpose-shear-force-sensing probe.

SUMMARY OF THE INVENTION

We have invented a scanning, imaging system which includes a shear-force-sensing probe which is to be used for scanning at least a portion of the surface of a sample. Thus, the inventive system includes a fine probe which has a longitudinal axis and a tip. The system also includes means for positioning the probe tip adjacent the surface, and means for displacing the probe tip relative to the surface. The relative tip displacement includes a scan pattern, such as a raster scan, which lies substantially in a plane, referred to hereinafter as the "scanning plane". The scanning plane lies substantially parallel to the surface portion which is scanned. The displacement means also include means for oscillating the probe tip relative to the surface at least at one oscillation frequency. In contrast to prior art scanning systems in which a probe tip is oscillated, the relative tip oscillations according to the inventive system lie substantially within the scanning plane. The system further includes a position-sensitive photodetector, and means for optically imaging the probe tip onto the position-sensitive photodetector such that changes in the oscillation of the probe tip can be detected.

DETAILED DESCRIPTION

Figure 1:
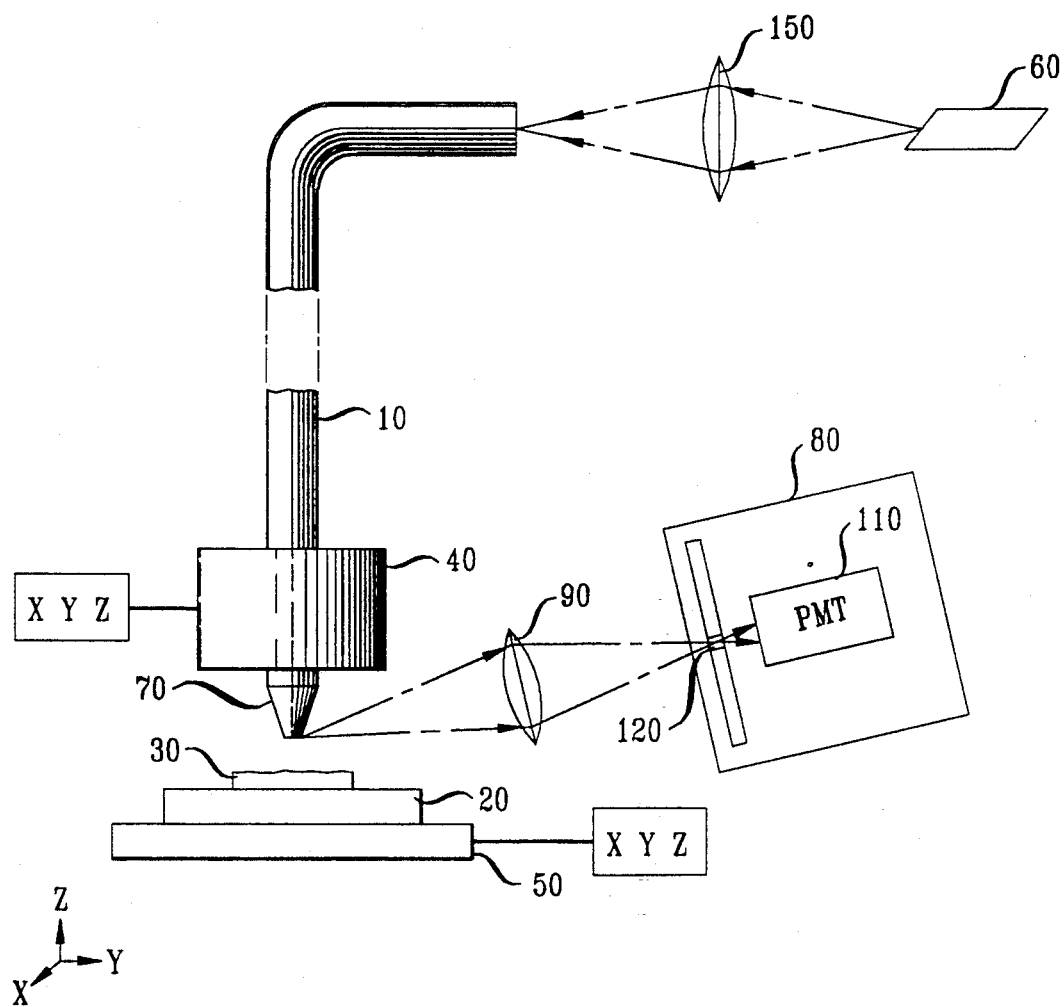
FIG. 1 is a schematic representation of an exemplary embodiment of the inventive imaging system.

A currently preferred embodiment of the invention is now described with reference to FIG. 1. A probe 10 is provided, together with stage 20 for supporting sample 30, and means 40 and 50 for displacing the probe relative to the sample. The displacing means are exemplarily piezoelectric actuators capable of displacing the sample or the stage in at least one lateral direction (denoted X and Y in the figure), and/or in the vertical direction (denoted Z). Light source 60 is provided for illuminating the probe tip 70, and position-sensitive photodetector 80 is provided for detecting light from the probe tip and sensing displacements of the probe tip.

Shear forces affect the motion of the probe tip, relative to the sample surface, in several respects that make detection possible. For example, a lateral, periodic (e.g., sinusoidal) oscillation is readily imparted to the probe tip by actuator 40. (Such oscillatory motion will be referred to hereafter as "dither" motion.) In the presence of shear forces, the amplitude of the oscillation is changed as the tip is brought closer to the sample surface. Additionally, the phase of the oscillation, relative to the driving voltage, is observed to change as the tip approaches the surface. Both amplitude changes and phase changes are readily observed. Either type of change, or combination of both, is useful for feedback and for imaging.

The probe will generally have at least one mechanical resonance at a resonance frequency. (Resonances of interest will be correspond to local maxima in the oscillatory amplitude, relative to variations of the driving frequency.) The resonant frequency will also be affected by shear forces. If the probe is oscillated at a frequency which is near resonance, shear forces will shift the resonance either closer to, or further from, the driving frequency. As a result, the oscillatory amplitude of the probe tip will increase or decrease, respectively. Both amplitude and phase are particularly sensitive to shear forces under such near-resonant driving conditions. This is especially true because probes are readily made having high Q (i.e., quality factor) values. Thus, for example, it may be advantageous to drive the probe oscillations at a near-resonant frequency. An appropriate frequency for amplitude detection produces, e.g., an oscillatory amplitude which, when the probe tip is far from the sample surface, is about 70% of the (local maximum) amplitude at resonance, since that is where the slope of the resonance curve is steepest. On the other hand, the phase is most sensitive to the driving frequency precisely at resonance. Thus, a preferable frequency for phase detection is approximately at resonance.

The inventive technique is sensitive even to very small shear forces, because, inter alia, the relevant spring constant of the probe tip is quite small, typically 0.1–1000 N/m, and the peak-to-peak displacement during an oscillation is typically only about 50–100 Å when the probe tip is far from the sample surface (i.e., when shear forces are negligible), and generally even smaller when the probe tip is sensing the surface. An additional, desirable consequence of the low spring constant, high Q value, and small oscillatory displacement is that the technique is relatively non-destructive of the sample and probe tip.

Figure 2:
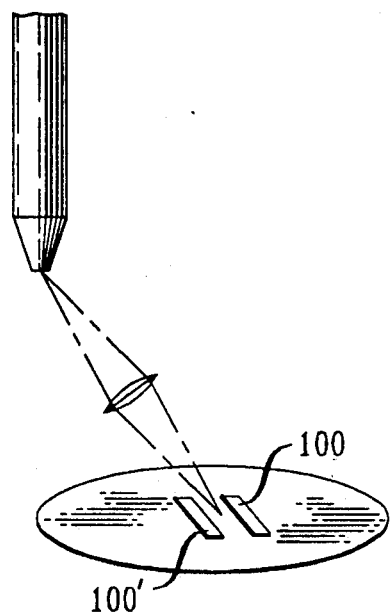
FIG. 2 is a schematic representation of an exemplary means for position-sensitive photodetection.
Figure 3:
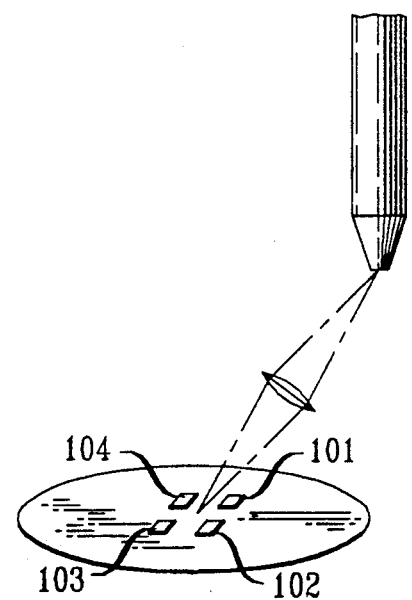
FIG. 3 is a schematic representation of an alternative means for position-sensitive photodetection.
Figure 4:
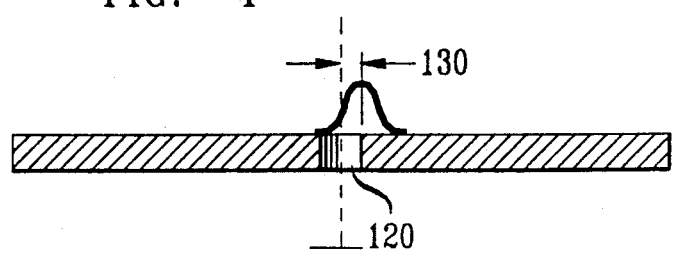
FIG. 4 is a schematic representation of a preferred method for aligning a pinhole mask for purposes of position-sensitive photodetection.

In an exemplary detection scheme, tip 70 is optically imaged onto position-sensitive detector 80 by, e.g., lens 90. Such a detector includes, for example, a pair of photodiodes arranged on either side of a gap. Such an arrangement of diodes 100, 100' is shown in FIG. 2. (Alternatively, for two-dimensional sensitivity, four photodiodes 101–104 are readily provided in a quadrilateral arrangement separated by a cross-shaped pair of gaps, as shown in FIG. 3). An alternative detector includes a photomultiplier tube 110 arranged to detect only such light as passes through a pinhole 120, as shown in FIG. 1. The tip is optically imaged onto the pinhole, except for a small lateral offset 130 in the direction of the dither motion, shown in FIG. 4. The amount of offset is adapted to maximize the ac component (at the dither frequency) of the photomultiplier output when the probe tip is dithered at a given dither amplitude. (It should be noted in this regard that the absolute ac signal is typically maximized, rather than the ac signal normalized to the corresponding dc signal.) The image of the probe tip (shown in the figure as an intensity profile) will typically be a diffraction-limited spot magnified by the magnification of lens 90. The pinhole diameter will typically be equal to the diameter of this (magnified) spot. The offset will typically be just enough to give about 70% of the maximum dc signal from a stationary image.

One advantage of the inventive technique is that the displacement of the probe tip is measured directly. As a consequence, systematic or slowly varying errors in the position of the probe tip are readily detected and corrected. Such errors may arise, e.g., from non-linear behavior of the piezoelectric actuators, or from lateral attraction between the probe tip and a vertical wall of a nearby surface feature on the sample.

Figure 5:
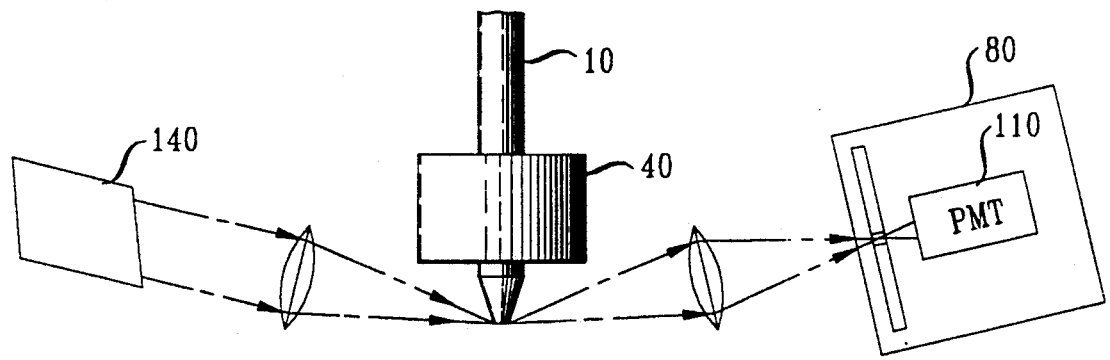
FIG. 5 is a schematic representation of an optical arrangement for external illumination of a probe tip, according to one embodiment of the invention.

The light used for imaging the tip is readily impinged onto the tip from an external source 140, as shown in FIG. 5. Alternatively, if the tip is fashioned from an optical fiber, as shown in FIG. 1, means 150 are readily provided for coupling the light into the fiber at the end distal the probe tip, and light for imaging is light emitted by the tip. Such internal illumination, when it can be used, represents a significant advantage over other force microscopes using optical detection, because the light spot remains bound to the tip, and need not be raealigned each time the tip is moved. However, internal illumination cannot be used, and external illumination must instead be used, where the probe is made from an opaque material, for example by electrochemically etching a tungsten wire.

Optical fiber probes are particularly useful in conjunction with near-field scanning optical microscopy (NSOM). That is, the same probe can be used as both a shear-force probe and as an NSOM probe. In addition to providing a contrast mechanism alternative to the optical NSOM contrast mechanism, the shear-force mode of operation can provide a feedback signal for keeping the probe at an approximately constant height above the sample during NSOM imaging. The use of such feedback is advantageous because it improves NSOM image resolution and contrast, and permits the probe to follow the vertical contours of the surface being scanned.

Optical fiber probes for NSOM are readily made from either single-mode, or multimode, fiber. Single-mode fiber is preferred because it generally provides better signal strength, reliability, and spatial resolution.

Figure 6:
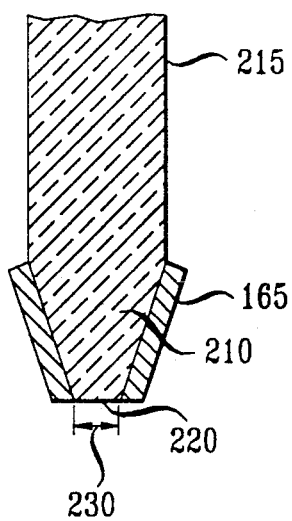
FIGS. 6 and 7 are schematic representations of exemplary probes useful for near-field scanning optical microscopy as well as for shear-force detection.
Figure 7:
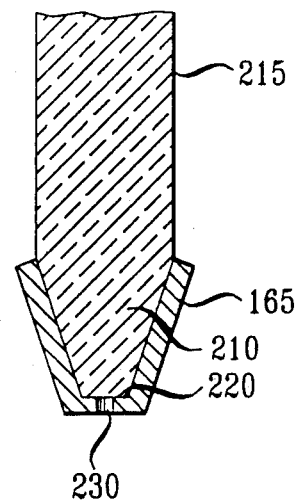

If an internally illuminated optical fiber probe is to be used, it is generally preferable to use a fiber which does not have a metal coating, because such coatings tend to reduce the signal strength. However, there is an important exception to this rule. That is where the same fiber probe is to be used for both shear-force detection and for NSOM. It is advantageous, for purposes of NSOM imaging using optical fiber probes, to coat at least a terminal portion of such probes with metal, or, more generally, with an opaque material having a relatively small penetration depth for the electromagnetic radiation guided in the fiber. Opaque coating 165 is depicted in FIGS. 6 and 7. In the case of an internally illuminated NSOM probe, it may be useful to employ the same light for NSOM imaging and shear-force detection, despite the fact that a coated fiber is used.

In the case of combined NSOM and shear-force detection, using either internal or external illumination, the dc component of the detected light may be used to create an NSOM image, while the normalized ac component is used to create a shear-force image, or to provide a shear-force feedback signal. (The normalized ac component is the absolute ac component, divided by the dc component. Normalization is necessary in order to compensate for variations in, e.g., the transmissivity of the sample.) Alternatively, a beamsplitter may be employed to divert some of the light from the probe tip before it reaches the position-sensitive detector, and instead, to direct it into a separate photodetector for NSOM imaging. Such a scheme may improve the signal-to-noise ratio in the NSOM image by reducing the effects of mechanical vibrations, which might otherwise add low-frequency noise to the NSOM signal passed through the pinhole.

Although the same wavelength can be used for both NSOM imaging and shear-force detection, it may be useful, especially where extremely high sensitivity is required, to employ separate wavelengths. In such a case, spectral filtering would be used to exclude the shear-force wavelength from an NSOM optical detector and to exclude the NSOM wavelength from a shear-force optical detector. In such an arrangement, the shear-detection wavelength would come from an external light source and would typically be focussed to a diffraction-limited spot on the probe tip by, e.g., a microscope objective.

As noted, above, feedback by shear-force detection is useful in NSOM in order to maintain the probe tip at a constant, or approximately or inferentially constant, distance from the sample surface. One convenient way to achieve this is to maintain a constant shear-force signal during an NSOM scan in which the same probe is used both for NSOM imaging and for shear-force detection. Changes in the shear-force signal are used in a closed loop arrangement using the vertical (i.e., Z-component) displacement capability of actuator 40 or actuator 50 (shown in FIG. 1) to adjust the height of the tip above the sample in order to restore the signal to a predetermined level.

Figure 8:
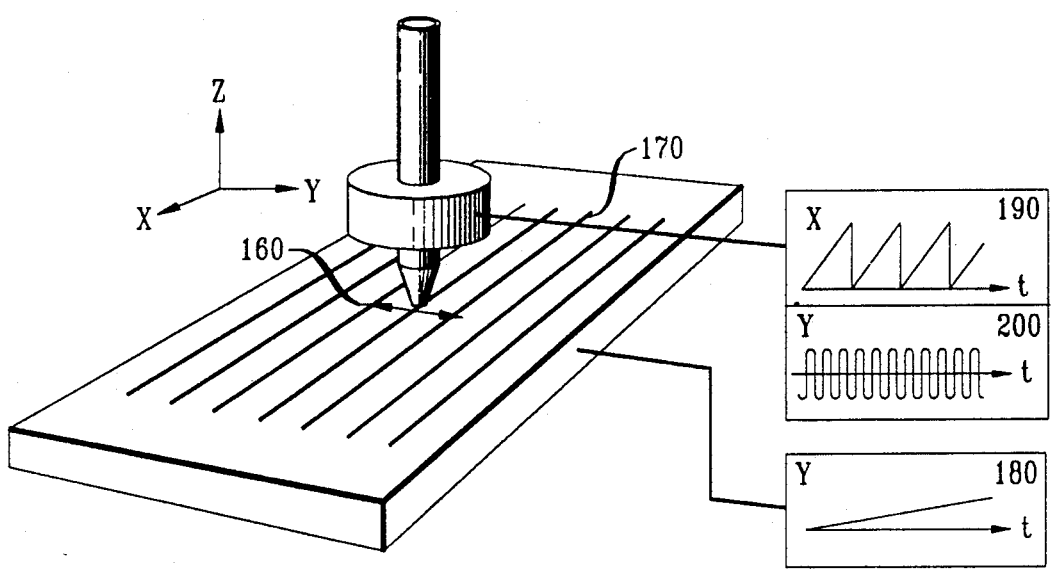
FIG. 8 is a schematic representation of an exemplary arrangement for raster scanning and for oscillating the probe relative to the sample, according to one embodiment of the invention.

As illustrated in FIG. 8, the dither motion 160 used for shear-force sensing is readily imposed on the raster motion 170 of the NSOM scan. Thus, the total relative motion between the probe tip and the sample is the sum of a raster component and a dither component. The relative motion may be provided entirely by moving the sample, entirely by moving the probe, or by a combination of the two. The dither frequency should be high enough to provide an adequate signal-to-noise ratio in the NSOM image. For that purpose, it is often desirable to make the dither frequency greater than the pixel frequency of the NSOM scan.

For example, a useful raster pattern is readily generated by moving the sample along the slow scan axis (driving waveform 180 of FIG. 8), and moving the probe along the fast scan axis (driving waveform 190). In such a case, the position-sensitive optical detector should be insensitive to probe displacements along the fast axis, and the dither motion should consequently be oriented parallel to the slow scan axis (driving waveform 200). Alternatively, it is simpler, but generally slower, to effectuate the raster motion by moving the sample along both the fast and slow axes. In such a case, by contrast, the dither motion (which is then necessarily applied to the probe) may take the fast-axis orientation, or the slow-axis orientation, or even an intermediate orientation.

A probe which is to be used for combined NSOM imaging and shearforce imaging is preferably made from a tapered, optical fiber. As noted, it is desirable to provide an opaque coating on the outside of the fiber at least in the taper region, in order to confine the electromagnetic radiation propagating in the fiber. Such a coating should have a small penetration depth for electromagnetic radiation of the wavelength used for NSOM imaging. For visible wavelengths, aluminum coatings are useful for this purpose. (Hereafter, the term "light" will be used to denote, not only visible wavelengths, but also infrared and ultraviolet wavelengths of electromagnetic radiation.) Appropriate NSOM probes, and methods of NSOM imaging, are described in detail in co-pending U.S. patent application Ser. No. 07/771,413, filed by R. E. Betzig, et al. on Oct. 10, 1991.

With reference to FIGS. 6 and 7, the tapered end 210 of fiber 215 terminates in a substantially flat face 220 oriented substantially perpendicularly to the longitudinal axis of the fiber. An optical aperture 230 is defined in the end flat in one of two ways. In the first, shown in FIG. 6, the end flat is simply left bare of the opaque coating, so that substantially the entire area of the end flat can admit electromagnetic radiation to the fiber. In the second, shown in FIG. 7, the opaque coating is, in fact, applied to the end flat as well as to the sides of the fiber probe. In that case, an aperture, smaller than the end flat, is defined by excluding, or by removing, opaque coating material from a circular region at or near the center of the end flat.

If the probe is to be used for shear-force imaging without NSOM imaging, it is not necessary to make the probe from an optical fiber. The only requirements are a relevant spring constant less than about 1000 N/m, and the ability to form a probe tip fine enough to provide the desired spatial resolution. Thus, as noted, a useful probe is readily made from, e.g., an electrochemically etched tungsten wire. However, it is preferable to use an optical fiber, and still more preferable to use a single-mode optical fiber, for several reasons. For example, probes made from optical fibers are simple and inexpensive, and can be made by a simple process which gives highly reproducible results. Fiber probes are readily drawn down to a very small tip diameter; for example, a single-mode fiber is readily drawn down to a tip as small as about 100 Å in diameter. Furthermore, a taper angle (defined as one-half the vertex angle) as small as about 10°, or even less is readily produced near the tip of such a drawn fiber.

Figure 9:
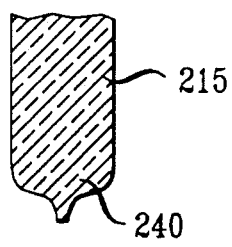
FIG. 9 $\propto$ 11 are schematic representations of alternative probe-tip configurations.
Figure 10:
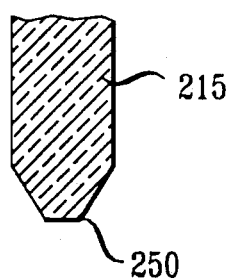

Furthermore, the drawing process that results in production of a fiber probe is readily adaptable to produce extremely sharp tips for enhanced resolution. That is, tips are readily made which terminate in a nipple 240 (see FIG. 9) or in an end flat having a sharp edge 250 (see FIG. 10). A nipple-shaped tip is particularly useful because it combines two desirable properties. First, it can be made very thin in order to give high resolution and to penetrate narrow crevices in the sample surface. Second, it can be made relatively short, so that although it is thin, it is still stiff enough to oscillate at desirable frequencies.

Figure 11:
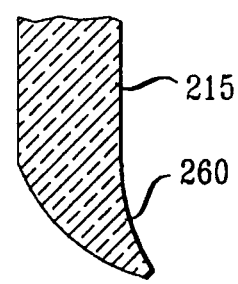

If an end flat having a sharp edge is oriented perpendicular to the longitudinal axis of the fiber (as is usually the case), the fiber must be tilted in order to expose the edge to the surface of the sample. However, a fiber probe having a "hook-shaped" tip 260, as shown in FIG. 11, is readily produced, in which a terminal portion of the probe is curved in order to expose the edge to the sample surface even when the rest of the probe is oriented perpendicular to the surface. It should be noted in this regard that if a fiber probe is to be used for shear-force detection without NSOM imaging, the opaque coating can be omitted without substantially diminishing the effectiveness of the probe.

It should be further noted that although in a currently preferred embodiment, the longitudinal axis of the probe is substantially perpendicular to the sample surface, such perpendicularity is not an essential requirement. As noted, a perpendicular probe is flexible in the lateral direction and thus advantageously avoids collision damage against vertical surface features. In some cases, it may be desirable to tilt the probe relative to the sample, in order to avoid damage from collisions in the vertical direction, or in order to bring the sharp edge of an end flat adjacent the sample surface without forming a hooked probe tip. For such purposes, the longitudinal axis of the probe may usefully describe an angle with the sample surface of about 45° to about 90°.

Various illumination geometries are useful for NSOM imaging. In an illumination-transmission geometry, light is emitted by the probe and detected after transmission through the sample. In an illumination-reflection geometry, light is emitted by the probe and detected after reflection from the side of the sample nearest the probe. (In either case, the light which is detected may, alternatively, be fluorescent emission which is stimulated by the illumination light.) In a collection-transmission geometry, light from an external source is transmitted through the sample and collected by the probe. In a collection-reflection geometry, the collecting probe is situated on the same side of the sample as the external light source. In any of the NSOM geometries, sufficient light is generally reflected, emitted, or scattered by the probe tip to make shear-force detection possible. As noted, an auxiliary light source is readily provided for shear-force detection with enhanced sensitivity.

The amplitude of the dither motion is preferably about 50 Å when the probe tip is far from the sample surface (i.e., when surface shear-force effects are negligible), and about 5 Å–10 Å when at the appropriate feedback level.

As noted, above, the dither frequency is usefully adjusted to match, or nearly match, a resonant frequency of the probe. The resonant frequencies can be tailored by adjusting the length, diameter, and shape of the probe tip. Such adjustments include adjustments effected by modifying the fiber-pull conditions, as well as adjustments effected by changing the length of the terminal portion of the fiber probe extending from a rigid holder. (It should be noted in this regard that such adjustments generally affect the spring constant as well.) When the probe is driven at or near a resonance, both the amplitude and the phase of the tip oscillations are particularly sensitive to shear forces. As a general rule, the higher the Q (i.e., the quality factor) of a resonantly driven tip, the higher will be the sensitivity to shear forces.

The selection of a dither frequency may involve a tradeoff between two effects. On the one hand, the selection of a higher frequency is desirable because that makes a faster scan possible. On the other hand, higher dither frequencies appear in at least some cases to feed back at greater heights above the sample surface, resulting in less spatial resolution. Thus, the choice of frequency may involve a compromise between speed and resolution.

As noted, a position-sensitive photodetector is provided for detection of the shear-force signal. The photodetector output will have an a.c. component at the dither frequency. This component will be affected by shear forces. Both amplitude and phase information are readily obtained from the ac component by demodulating it with a reference signal and its quadrature.

Phase information is especially useful because the response of the phase to changes in the shear force exerted on the probe tip is substantially instantaneous, and the phase is relatively insensitive to mechanical noise (in the form of unwanted vibrations). For feedback purposes, the height of the probe tip above the sample surface is continuously adjusted to maintain the amplitude, or the phase, or a combined function of amplitude and phase, within predetermined limits. Additionally, either the amplitude, or the phase, or both, are useful for image generation.

Where high scanning speed is important, it is desirable to move the probe tip, rather than the sample, in at least one scan direction. Thus, for example, the sample will be moved along the slow scan axis (the Y axis of FIG. 8), the probe will be moved along the fast scan axis (the X axis of FIG. 8), and the probe will be dithered parallel to the slow scan axis (i.e., the Y axis).

Figure 12:
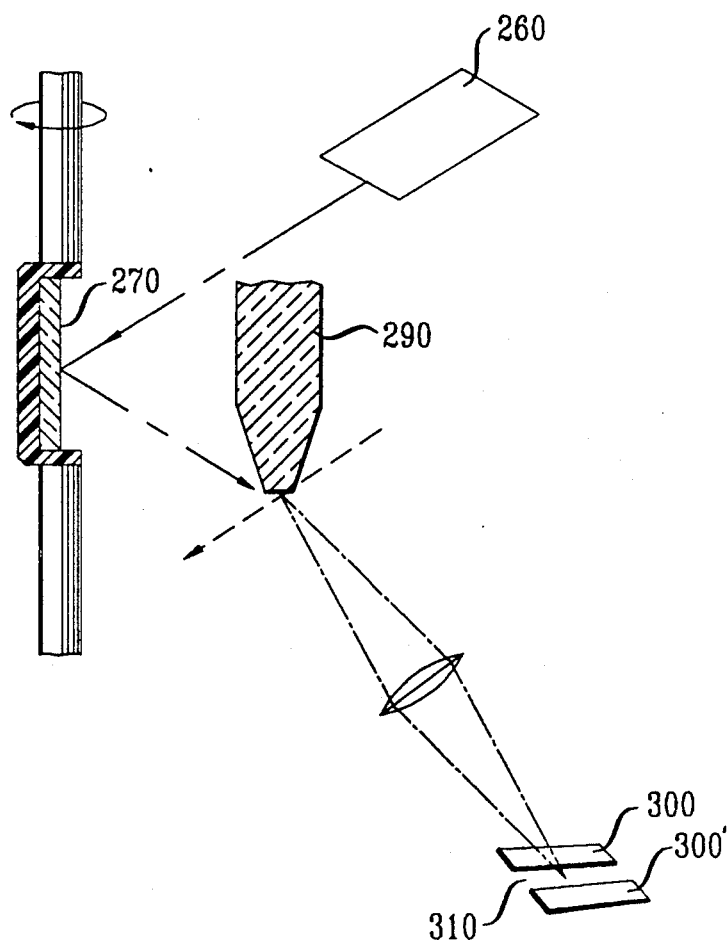
FIG. 12 is a schematic representation of an exemplary optical arrangement in the case where the probe tip is moved as part of the raster scan.

Turning now to FIG. 12, if an externally illuminated probe tip is scanned as part of the raster pattern, it will be necessary to provide means, such as piezoelectrically driven deflecting mirror 270, for directing light (for dither detection) from (stationary) source 280 onto the moving tip 290. Such a deflecting mirror may be driven by, e.g., an open-loop control circuit with reference to the same voltage which drives the scanning motion of the probe. Alternatively, a feedback mechanism may be provided which enables the deflecting mirror, under closed-loop control, to track the probe tip as it advances along the (fast) scan axis.

As noted, when one component, e.g., the fast-axis component, of the raster scan is effectuated by moving the probe, the position-sensitive photodetector should be insensitive to the raster component of the probe motion. In such a case, an exemplary photodiode detector would include a pair of elongated photodiodes 300, 300' separated by a narrow gap 310 which is elongated parallel to the fast axis. Because such an arrangement is sensitive only to displacements having a component perpendicular to the gap (e.g., displacements having a component along the slow axis), it will detect dither motion along the slow axis, but will not detect the raster motion of the probe tip. Similarly, an exemplary photomultiplier-tube detector would include a mask containing a slit instead of a pinhole. Like the photodiode gap, the slit would be oriented parallel to the axis of insensitivity, which is exemplarily the fast axis.

The inventive imaging system has applications, inter alia, in fields of manufacturing. For example, many manufacturing processes involve patterning a surface of a substrate. Such a substrate is, for example, a semiconductor wafer. A typical pattern to be formed on such a substrate is a pattern of metal conductors, formed by metallic deposition followed by deposition of a resist material, selective exposure of the resist to actinic radiation, development, and etching. Such processes are characterized by process parameters which must often be optimized through trial and error. Thus, one or more substrates are typically processed for trial purposes. The pattern which has been formed on such substrates, according to initial process parameters, is examined, and one or more characteristic dimensions, such as conductor linewidths, are measured. If the characteristic dimensions fail to conform to predetermined specifications, one or more of the process parameters are changed in order to bring subsequently processed substrates into conformity. Such characteristic dimensions are readily measured by imaging patterned surfaces, or portions thereof, by means of the inventive system.

EXAMPLE

A one-meter section of single-mode optical fiber was provided, having respective core and cladding diameters of 3.0 $\mu$m and 80 $\mu$m, a cutoff wavelength of 450 nm, and a numerical aperture of 0.12. A few inches of jacket were stripped from one end of the fiber, and the end portion was mounted, using customized mounting blocks, in a Model P-87 micropipette puller manufactured by the Sutter Instrument Co. The fiber was heated by a 50-watt cw carbon dioxide laser, and pulled under the following program: Pull=255; Velocity=4; Time=1. There resulted a long fiber portion which included the desired probe tip, and a short portion which was discarded. It was found that the conformation of the tip could be varied by changing the pulling parameters, the laser focus, the beam power, or the position of the laser beam relative to the pulled fiber.

Figure 13:
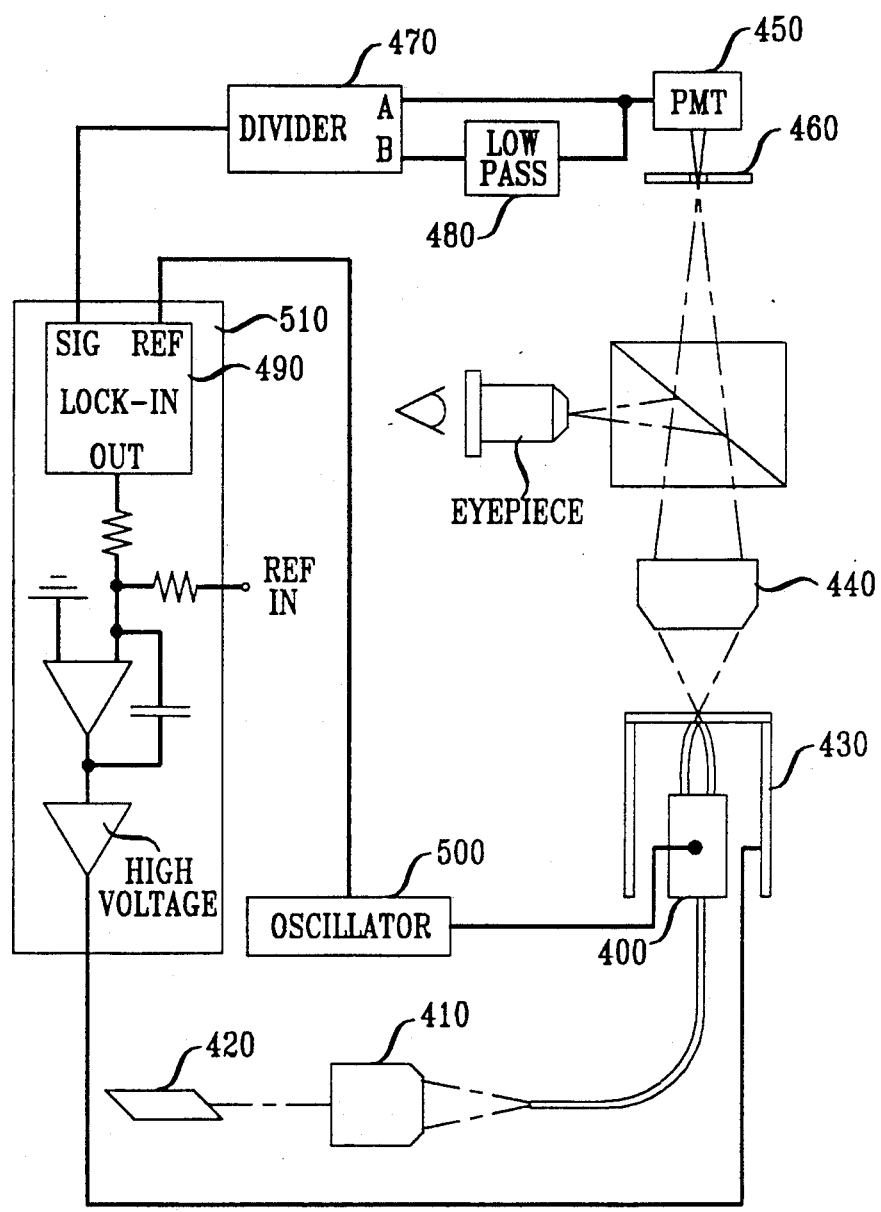
FIG. 13 is a schematic representation of the inventive imaging system in one embodiment, including an exemplary electronic signal-processing circuit.

The fiber probe was then assembled, as described below, in the system represented schematically in FIG. 13.

For handling convenience, the fiber end was threaded through a short length of glass capillary tube and glued in place, with a terminal portion of the fiber, including the probe tip, protruding through an end of the capillary tube. It was found that the resonant frequency and spring constant of the probe tip could be tailored by changing the taper length, the diameter in the taper region, and the amount of fiber extending from the capillary. The capillary tube was mounted in a holder attached to a piezoelectric tube 400 which was mounted, in turn, in a mechanical micropositioner. The trailing end of the optical fiber was threaded through the back of the micropositioner, cleaved, and connected to a fiber coupler 410. Feeding into the fiber through the fiber coupler was an argon-ion laser 420 operating, typically, at a wavelength of 514 nm, and having a beam power that was typically in the range 10 microwatts to 1 milliwatt. A sample was prepared, which consisted of a film of polystyrene spheres spin-deposited on a glass cover slip. The mean diameter of the spheres was 190 Å. The sample was mounted on a holder attached to a second piezoelectric tube 430.

Coarse alignment was carried out by moving the probe tip by means of the mechanical micropositioner while viewing the probe tip in a side-looking, conventional microscope and in a conventional microscope aligned approximately coaxially with the probe. The objective lens 440 of the coaxial microscope also served to collect the light from the probe tip for shear-force detection. Position-sensitive detection was performed by a photomultiplier tube 450 with a pinhole mask 460. A pinhole diameter of 50 $\mu$m was used. This diameter was approximately equal to the size of the magnified light spot imaged from the probe tip. During coarse alignment, the probe tip was centered with respect to the collection objective, and the pinhole was initially centered with respect to the image, on the mask, of the probe tip.

The photomultiplier output was fed into the A and B input channels of a divider circuit 470. Between the photomultiplier and the B input, a low-pass filter 480 was provided in order to exclude the ac component from that channel. The output of the divider was the ratio A/B, representing the normalized ac signal. The normalized ac signal was fed into the signal input of a lock-in amplifier 490, and the waveform, produced by a frequency synthesizer 500, for driving the dither motion was fed into the reference input of the lock-in amplifier. The output of the lock-in amplifier represented the demodulated shear-force signal. The lock-in amplifier typically had an output time constant of 0.1 ms.

The probe tip was then dithered in an arbitrary, lateral direction at a frequency known to be below the first resonant frequency. The pinhole was then offset in the dither direction in order to reduce the dc signal collected after passing through the pinhole to about 0.7 times its maximum value. The dither frequency was then increased until a sharp rise in the demodulated signal indicated that the probe was being resonantly driven. It was found that probe resonances were readily distinguishable from other system resonances by their high Q values. A typical resonant frequency was about 80 kHz. The dither amplitude was then adjusted to about 50 Å.

The height of the probe tip above the sample surface was then reduced to less than about 2 $\mu$m using the mechanical micropositioner. The pinhole, collection objective, and probe tip were then realigned to the offset positions described above.

A feedback loop was then effectuated by using conventional feedback electronics 510 to control the height (i.e., Z-component) of the probe tip via the sample piezoelectric tube, subject to a constraint. The constraint was that the dither amplitude (as represented by the demodulated signal) must be a certain fraction (typically in the range 0.1–0.5) of the dither amplitude under free-space (i.e., far from sample) conditions.

Figure 14:
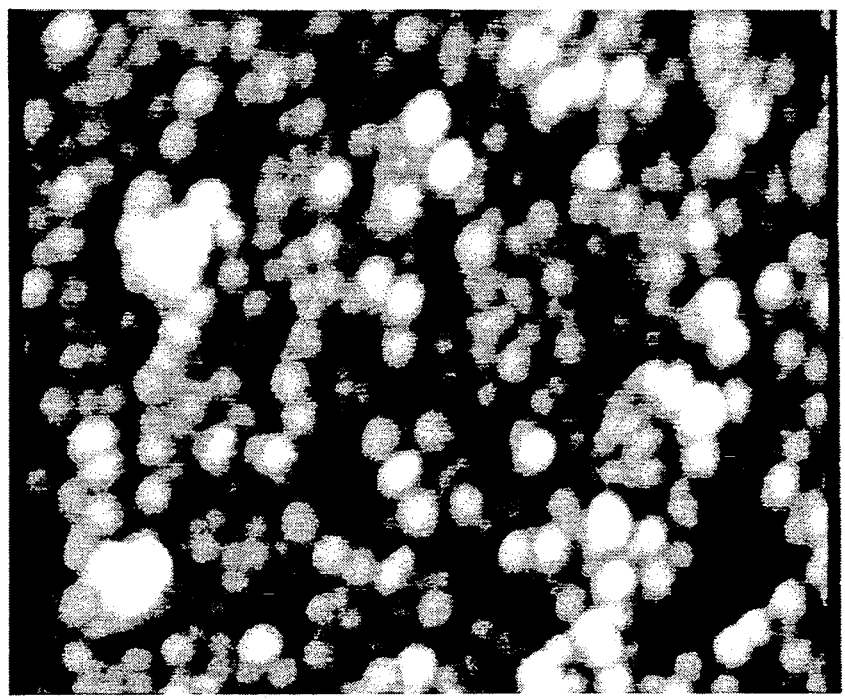
FIG. 14 is an exemplary image produced by the imaging system of FIG. 13.

The raster scan was then initiated. The Z input of the sample piezoelectric tube was digitized and displayed using conventional video display means. At a typical scan speed, a 256×256 pixel image was scanned in 15 seconds over a 0.8 $\mu$m×0.8 $\mu$m field. The resulting image is shown in FIG. 14.

I claim:

1. A system for scanning at least a portion of the surface of a sample, the system comprising: a probe having a longitudinal axis and a tip; means for positioning the probe tip adjacent the surface; means for displacing the probe tip relative to the surface such that a scan pattern is described in a plane, to be referred to as the "scanning plane," which lies substantially parallel to the surface portion; and means for oscillating the probe tip relative to the surface at least at one oscillation frequency, characterized in that the oscillating means are adapted to oscillate the probe tip substantially within the scanning plane; and the system further comprises:
a position-sensitive photodetector; and means for optically imaging the probe tip onto the position-sensitive photodetector such that changes in the oscillation of the probe tip can be detected.

2. The system of claim 1, wherein the scanning plane is substantially perpendicular to the longitudinal axis.

3. The system of claim 1, wherein the probe comprises a tapered, terminal portion of an optical fiber having first and second ends, the first end substantially coextensive with the probe tip.

4. The system of claim 3, further comprising a light source and means for coupling light from the source into the second fiber end.

5. The system of claim 3, wherein at least the tapered terminal portion of the optical fiber is coated with a material which is opaque to at least some wavelengths of electromagnetic radiation which can be guided in the optical fiber.

6. The system of claim 3, wherein the optical fiber is a single-mode fiber.

7. The system of claim 1, wherein the probe has at least one mechanical resonant frequency, and the oscillating means are adapted to oscillate the probe at or near the resonant frequency.

8. The system of claim 7, wherein the resonant frequency corresponds to a local maximum oscillatory amplitude of the probe tip with respect to variations of the oscillation frequency, the oscillating means are adapted to oscillate the probe at a frequency which corresponds to an amplitude about 70% of the local maximum, the position-sensitive detector produces an output signal, and the system further comprises a phase-sensitive detector which receives the output signal and processes it such that changes in the amplitude of the probe oscillations may be detected.

9. The system of claim 7, wherein the resonant frequency corresponds to a local maximum oscillatory amplitude of the probe tip with respect to variations of the oscillation frequency, the oscillating means are adapted to oscillate the probe at a frequency which corresponds to an amplitude approximately equal to the local maximum, the position-sensitive detector produces an output signal, and the system further comprises a phase-sensitive detector which receives the output signal and processes it such that changes in the phase of the probe oscillations may be detected.

10. The system of claim 1, wherein the position-sensitive detector produces an output signal, and the system further comprises a phase-sensitive detector which receives the output signal and processes in such that changes in the amplitude and/or the phase of the probe oscillations may be detected.

11. The system of claim 1, wherein the probe has a spring constant, relative to the oscillatory tip displacements, which is no more than about 1000 N/m.

12. The system of claim 1, wherein the position sensitive photodetector produces an output signal, and the system further comprises:
   a) means for deriving a feedback signal from the output signal; and
   b) means for controlling the distance between the probe tip and the sample surface such that the feedback signal is maintained substantially constant while the probe tip is being displaced in a scan pattern.

13. The system of claim 12, further comprising means for deriving a video display signal from the output signal or the feedback signal; and video display means for displaying a two-dimensional image which represents the video display signal.

14. A near-field scanning optical microscope which comprises an optical fiber having first and second ends and a tapered terminal portion including the first end, means for positioning the first end adjacent a surface of a sample, and means for displacing the first end relative to the sample in a raster pattern lying in a plane, to be referred to as the "scanning plane," substantially parallel to a portion of the surface such that the surface portion is scanned, the microscope further comprising:
   a) means for oscillating the probe tip relative to the surface, the direction of the oscillations lying substantially within the scanning plane;
   b) a position-sensitive photodetector capable of producing an output signal;
   c) means for optically imaging the probe tip onto the position-sensitive photodetector such that at least some changes in the oscillation of the probe will cause changes in the output signal;
   d) means for deriving a feedback signal from the output signal; and
   e) means for controlling the distance between the first end and the sample surface such that the feedback signal is maintained substantially constant while the first end is being displaced in a raster pattern.

15. A method for manufacturing an article, comprising the steps of:
   a) providing a multiplicity of semiconductor bodies, each semiconductor body having a surface to be patterned;
   b) setting at least one process parameter;
   c) processing at least a first semiconductor body according to the process parameter such that a pattern is formed on the surface of the semiconductor body, the pattern having a characteristic dimension;
   d) measuring the characteristic dimension in the first semiconductor body;
   e) comparing the characteristic dimension to a predetermined range of values;
   f) if the characteristic dimension lies outside the predetermined range of values, changing the process parameter to bring the characteristic dimension within the predetermined range of values;
   g) after (f), processing at least a second semiconductor body according to the process parameter; and
   h) performing, on at least the second semiconductor body, at least one additional step toward completion of the article, characterized in that
   the measuring step comprises situating, adjacent a portion of the surface, a probe having a tip; displacing the probe tip relative to the surface such that a scan pattern is described in a plane, to be referred to as the "scanning plane", which lies substantially parallel to the surface portion; oscillating the probe tip, relative to the surface, such that the oscillations lie substantially within the scanning plane; optically imaging the probe tip onto a position-sensitive photodetector which produces an output signal; and processing the output signal such that changes in the oscillation of the probe tip are detected.

* * * * *